April 7, 1925. 1,532,948
C. REES ET AL
DRYING APPARATUS
Filed Oct. 9, 1922 2 Sheets-Sheet 1
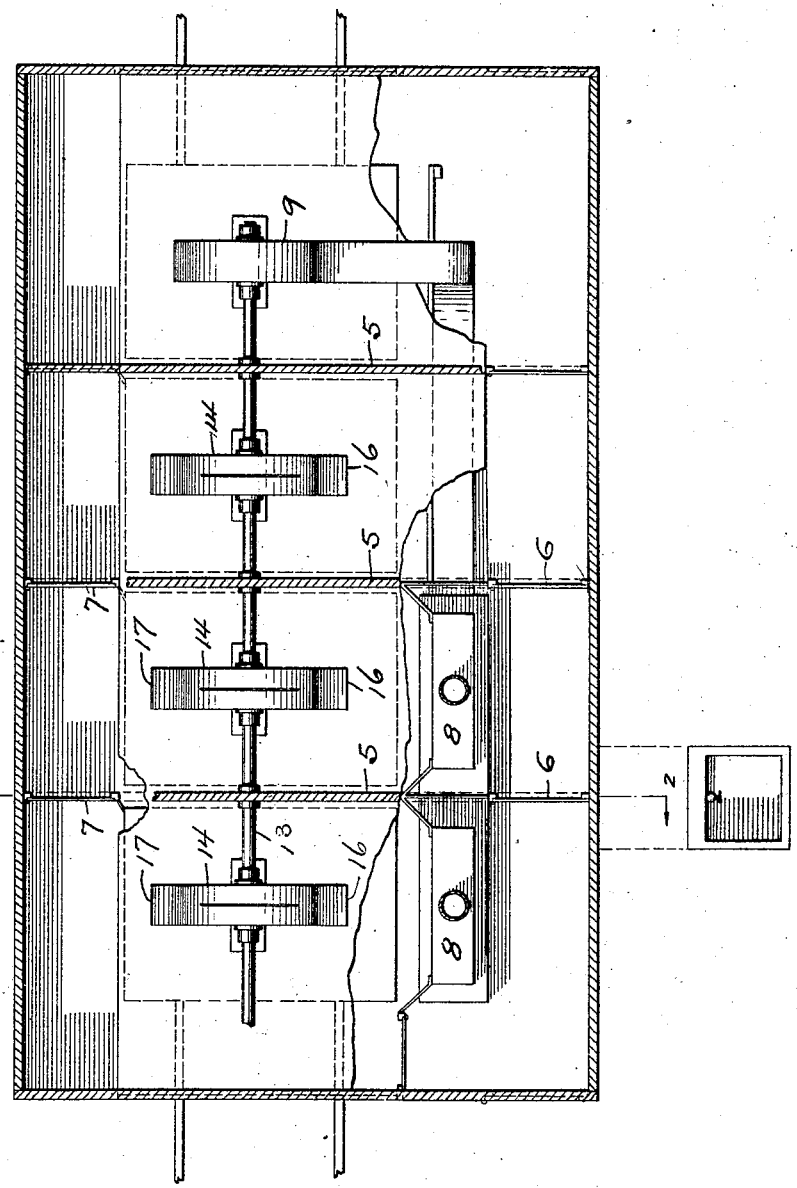
Witness:
H. Sherburne
INVENTORS
Claude Rees
Charles F. Hine
BY White Prat & Evans
their ATTORNEYS.

April 7, 1925.
C. REES ET AL
DRYING APPARATUS
Filed Oct. 9, 1922
1,532,948
2 Sheets-Sheet 2
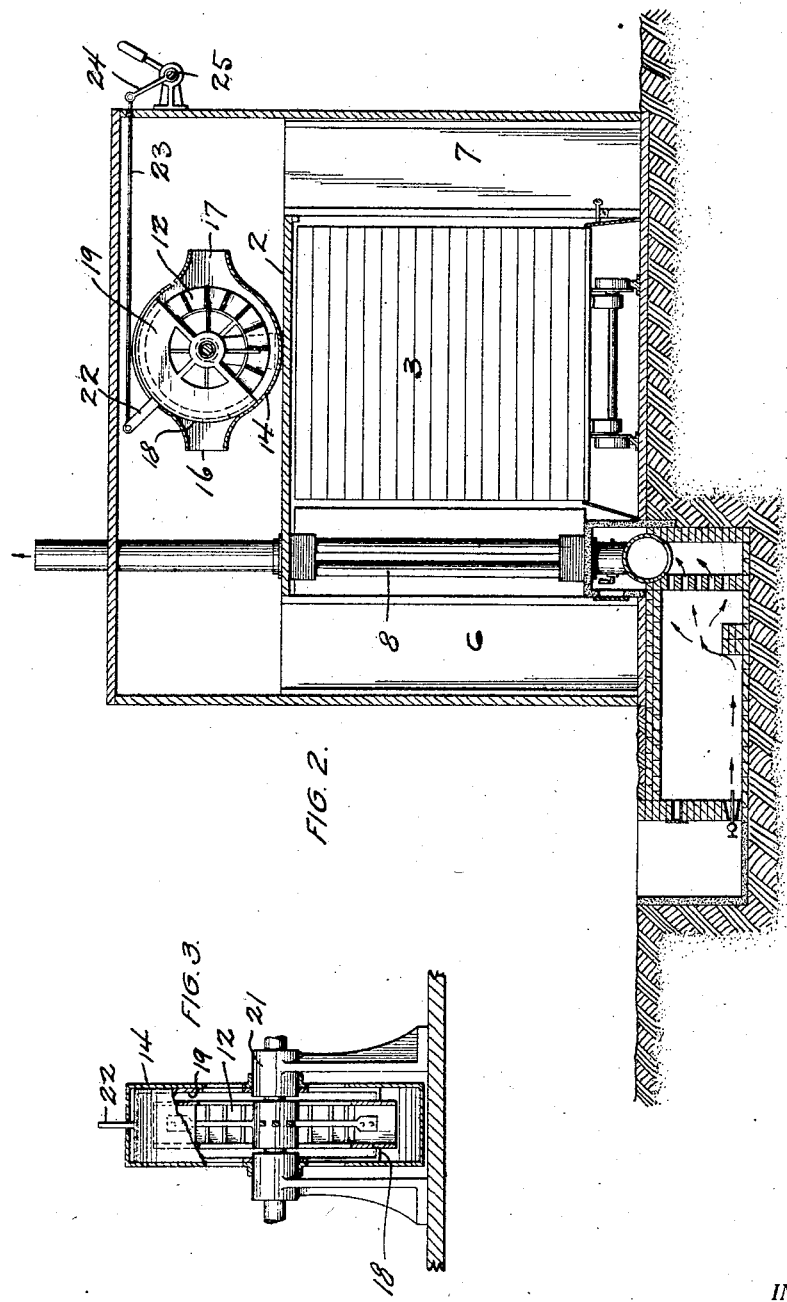
Witness:
H. Sherburne
INVENTORS
Cloude Rees
Charles F. Hine
BY White Prost & Evans
their ATTORNEYS.

Patented Apr. 7, 1925.

1,532,948

UNITED STATES PATENT OFFICE.

CLAUDE REES AND CHARLES F. HINE, OF SAN FRANCISCO, CALIFORNIA.

DRYING APPARATUS.

Application filed October 9, 1922. Serial No. 593,391.

*To all whom it may concern:*

Be it known that we, CLAUDE REES and CHARLES F. HINE, citizens of the United States, and residents of the city and county of San Francisco, State of California, have invented a certain new and useful Drying Apparatus, of which the following is a specification.

The invention relates to apparatus for drying substance, particularly food products such as fruit and vegetables.

An object of the invention is to provide means for evenly drying the substance.

Another object of the invention is to provide means for reversing the direction of the flow of the drying means over the substance, without reversing the direction of rotation of the circulating fans.

The invention possesses other advantageous features, some of which, with the foregoing, will be set forth at length in the following description where we shall outline in full, that form of the invention which we have selected for illustration in the drawings accompanying and forming part of the present specification. In said drawings we have shown one embodiment of the invention, but it is to be understood that we do not limit ourselves to such form, since the invention, as set forth in the claims, may be embodied in a plurality of forms.

Referring to said drawings:—

Figure 1 is a longitudinal horizontal section of a dryer embodying our invention.

Fig. 2 is a section taken on the line 2—2, Fig. 1.

Fig. 3 is a vertical section taken through the outer casing of one of the circulating blowers, showing the damper for controlling the discharge of air, part of the blower being shown in section.

The general type of drier to which the present invention is particularly applicable, is shown in Rees Patent No. 1,413,135 of April 18, 1922, to which reference is hereby made for a complete disclosure of a complete evaporator plant. Evaporators of this general type comprise a house having a compartment therein in which the substance to be dried is arranged, usually in vertically spaced layers between which the drying medium passes. In fruit driers, the fruit is usually arranged on trays having high sides and low ends, so that when the trays are stacked, the drying medium may pass longitudinally through the stack over the trays. As the drying medium passes over the filled trays from end to end, its temperature falls, so that the fruit at opposite ends of the tray is not uniformly dried. The drying medium is passed over the trays by circulating fans and in order to accomplish uniform drying of the fruit, the direction of rotation of the fans is reversed at intervals, to reverse the direction of travel of the drying medium over the fruit. The fans are usually belt driven and to accomplish their reversal, tight and loose pulleys and reverse belts are required. An object of the present invention is to provide means for reversing the direction of flow of the drying medium without reversing the direction of rotation of the circulating means.

The house is divided by a horizontal ceiling or partition 2, forming a chamber below the partition in which the stack of trays 3 is arranged, and a chamber above the partition in which the drying medium circulating means are arranged. Passages are provided within the house on both sides of the tray containing chamber, so that the drying medium may freely circulate. The house is further divided longitudinally into a plurality of compartments by the vertical partitions 5 arranged in the chamber above the ceiling and the movable vertical partitions or doors 6 and 7 disposed in the passages on both sides of the drying chamber, said partitions 5, 6 and 7 being alined. A heater, such as the radiator 8, is arranged in each longitudinal compartment, at the side of the drying chamber, so that the drying medium is heated once during each cycle of circulation. At one end of the house, a blower 9 is arranged to return the drying medium, or a portion of it, to the other end of the house, for recirculation. The blower and the fans cause a helical progression of the drying medium through the house, the medium passing over the fruit once in each convolution of the helix.

The present invention relates particularly to the circulation of the drying medium over the fruit and the reversal of the direction of flow of the medium so that uniform drying of the fruit is obtained. Arranged in each longitudinal compartment, in the space over the ceiling is a turbine blower or multi-vane fan enclosed in a housing which is so constructed, that it may be readily adjusted to direct the drying medium in either direction. The turbine blower runners 12, are secured to a shaft 13, extending longitudinally of the house and when the drier is in operation, this shaft is rotated continuously in one direction. Surrounding each runner is a housing 14, into which the drying medium is discharged from the runner and the housing is constructed so that the drying medium may be discharged from either side thereof. This may be accomplished in many ways and in the drawings we have shown one suitable construction.

The housing 14 is provided with outlet passages 16 and 17, at opposite sides thereof, and means are provided for closing one or the other of said passages, so that the drying medium may be discharged in either direction. This means comprises a semi-cylindrical damper 18, disposed within the housing and suitably supported therein, so that it may be moved to open one passage and close the other. This shape of damper is preferable, since it presents a smooth curved surface, at the closed passage, which conforms to the general shape of the housing, so that eddies and other sources of power loss are eliminated. The curved damper usually consists of the curved damper member 18 and a side wall 19, journalled on the runner shaft bearings 21 and provided with openings to permit the entry of the drying medium to the center of the runner.

The damper may be readily adjusted to open one or the other outlet passage and in the present instance, we have provided an arm 22 on the damper, extending through a circumferential slot in the housing, the slot being at all times covered by the damper. Attached to the arm is a rod 23, suitably guided so that it will not bend when subjected to longitudinal pressure, which extends to the exterior of the house. In most installations a plurality of circulating blowers are employed and the rods 23 from the blowers are preferably connected to levers 24 secured to the crank shaft 25, so that upon rotation of the shaft, all of the dampers are operated.

We claim:

1. In a drying apparatus a house, a drying chamber in said house, a driving shaft extending longitudinally in the house, a plurality of spaced blowers on the shaft for circulating the drying medium through the drying chamber, a blower on the shaft disposed adjacent one end of the house and a conduit for conveying the medium discharged by the latter blower to the other end of the house.

2. In a drying apparatus, a house, a horizontal partition extending part way across the house and dividing the house into a drying chamber and a circulating chamber, a shaft extending longitudinally of the house and disposed in the circulating chamber, a plurality of spaced blowers on said shaft for circulating the drying medium through the drying chamber and a blower on the shaft disposed adjacent one end of the house and arranged to return the drying medium to the other end of the house.

In testimony whereof, we have hereunto set our hands.

CLAUDE REES.
CHARLES F. HINE.